(No Model.)

W. L. FIELD.
SPLIT PULLEY.

No. 388,190. Patented Aug. 21, 1888.

Witnesses,
Frank G. Mattingly.
P. A. Brainard.

Inventor
Wallace L. Field
By his Attorneys
Whittlesey & Wright.

UNITED STATES PATENT OFFICE.

WALLACE L. FIELD, OF MENASHA, WISCONSIN, ASSIGNOR OF THREE-FOURTHS TO JOHN STRANGE, OF SAME PLACE.

SPLIT PULLEY.

SPECIFICATION forming part of Letters Patent No. 388,190, dated August 21, 1888.

Application filed February 4, 1888. Serial No. 263,029. (No model.)

*To all whom it may concern:*

Be it known that I, WALLACE L. FIELD, a resident of Menasha, in the county of Winnebago and State of Wisconsin, have invented certain new and useful Improvements in Split Pulleys; and I do hereby declare the following to be a full, clear, and exact description of the invention, such as will enable others skilled in the art to which it pertains to make and use the same.

My invention relates to belt-pulleys that are built up of several parts, and are split so as to be easily removable from the shaft.

The invention consists of certain details of construction that render the pulley simple in construction, easy to manipulate, and strong and durable in service.

Figure 1:
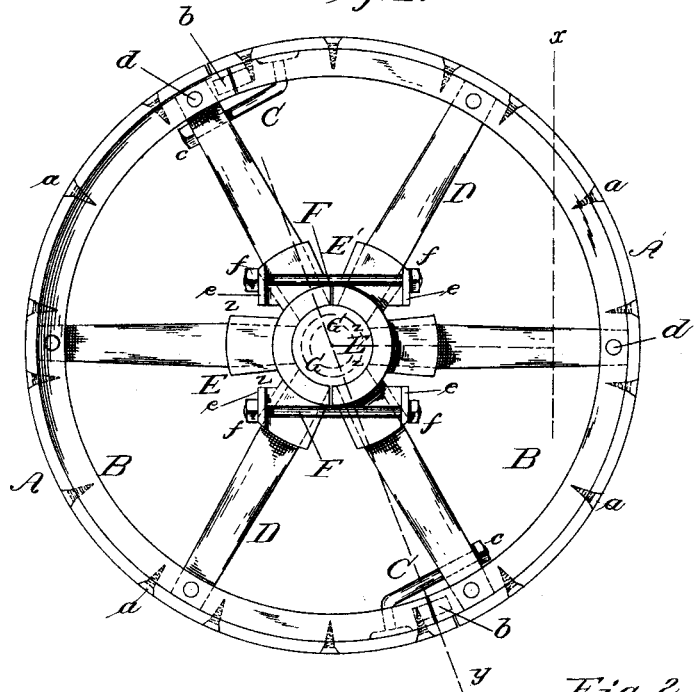
Figure 2:
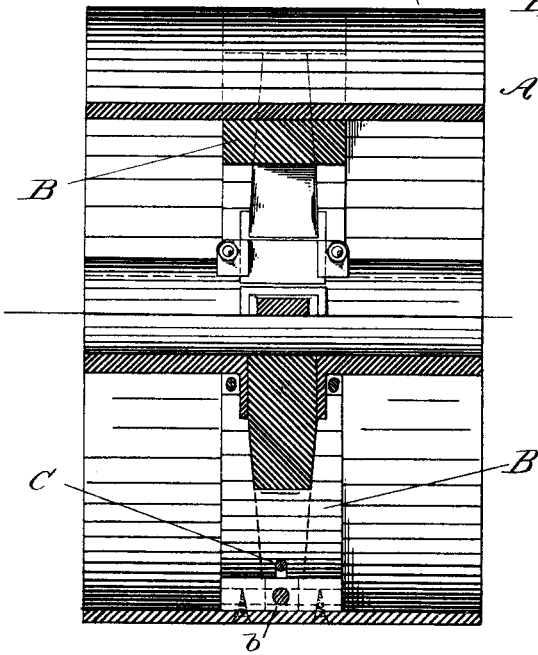

In the accompanying drawings, forming a part of this specification, Figure 1 is a side elevation of the pulley. Fig. 2 is a section taken on the crooked line $x\ y$ in Fig. 1.

The rim A is of wood, and consists of two sections steamed and bent into semi-circles. Secured to the inside of each section by screws $a$ is a semicircular felly, B, also of wood. The rim overlaps the felly at one end, while the felly projects beyond the rim at the other end, as shown. The meeting ends of the fellies are held in position by dowel-pins $b$. Through one end of each felly B is inserted a bolt, C, which is bent almost to a right angle at the point where it leaves the felly, and is passed through the nearest spoke of the other section of the wheel. Nuts $c$ serve to tighten the bolts and draw the two sections of the rim together.

The spokes D are of wood, and are tenoned into the fellies B, where they are secured by a pin, $d$, driven through the felly from side to side. The inner ends of the spokes are tapered slightly, and are inserted into sockets on the hub E. The hub is preferably made of malleable iron, and the sockets are cored out in suitable bosses, E', cast upon it. The sockets extend through the hub, and after the spokes have been inserted they may be tightened by wedges driven from the inside of the hub. The hub is made in similar halves, semi-cylindrical in shape, so that when placed together upon a shaft they will encircle it. On each side of the bosses that are nearest to the ends of the semi-cylinders are formed lugs $e$, arranged at such an angle to the radius of the hub that when the halves of the hub are placed together the lugs $e$ on one half will face those on the other half and be parallel with them. Through these oppositely-arranged lugs are passed bolts F with nuts $f$, by means of which the halves of the hub can be clamped tightly upon the shaft. The bosses E', in which are formed the sockets, stiffen the hub considerably; but it will be observed that the bosses do not run together, but are separated by a small space, leaving between them a portion of the hub. At these points $z$ the hub is relatively weak, and hence when the bolts F are tightened up the hub tends to spring or yield at these points $z$, thereby throwing the meeting edges of the hub-sections in toward the center of the hub or shaft. This brings a clamping-pressure upon the shaft, not only on the radial lines parallel with the bolts F, which pressure is greatest at the middle of the hub-sections midway between the meeting edges, but also on radial lines passing through the hub near the meeting edges and at intermediate points, these lines being not parallel with the bolts F. The pressure is thus practically brought upon the shaft all around it.

It is preferable to insert a bushing of paper, G, between the hub and the shaft, as indicated in dotted lines in Fig. 1, and by varying the thickness of this bushing, or by using several concentric bushings, the pulley is adapted to fit shafts of various sizes.

Having thus described my invention, what I claim, and desire to secure by Letters Patent, is—

1. The combination, with a two-part pulley, of the bent bolts C, secured, respectively, to each part and passing through a spoke on the other part, substantially as described.

2. A two-part pulley having a rim, A, composed of two semicircular sections, each section being united to a semicircular felly, B, the rim overlapping the felly at one end and the felly projecting beyond the rim at the other end, and dowel-pins $b$, uniting the meeting ends of the fellies, substantially as described.

3. A two-part pulley having a hub made in halves and united by bolts, each half having weakened portions, whereby it is caused to clamp the shaft in radial lines, some of which are not parallel with the bolts, substantially as described.

4. In a two-part pulley, a hub made in halves, each half having bosses E' cored out to form sockets for the spokes and separated to leave weakened portions z between them, the bosses nearest the meeting edges of the halves of the hub being provided with lugs e to receive the clamping-bolts, substantially as described.

WALLACE L. FIELD.

In presence of—
J. L. FIEWEGER,
E. DOOPON.